United States Patent [19]

Kawasaki et al.

[11] Patent Number: 4,922,170
[45] Date of Patent: May 1, 1990

[54] AUTOMOTIVE POWER SEAT ASSEMBLY

[75] Inventors: Shinzo Kawasaki, Tajimi; Kaoru Umeda; Norimasa Kitoh, both of Inuyama, all of Japan

[73] Assignees: Kabushiki Kaisha Imasen Denki Seisakusho, Inuyama; Honda Giken Kogyo Kabushiki Kaisha, Tokyo, both of Japan; a part interest to each

[21] Appl. No.: 141,088

[22] Filed: Jan. 5, 1988

[51] Int. Cl.$^5$ ............................................. H02P 7/00
[52] U.S. Cl. ................................... 318/434; 318/466; 318/469; 318/484
[58] Field of Search .............. 318/432, 433, 434, 466, 318/484, 469; 307/9, 10 R; 361/23

[56] References Cited

U.S. PATENT DOCUMENTS

| | | | |
|---|---|---|---|
| 4,404,632 | 9/1983 | Harada et al. | 318/466 X |
| 4,504,881 | 3/1985 | Wada et al. | 318/434 X |
| 4,611,154 | 9/1986 | Lambropoulos et al. | 361/23 X |
| 4,651,018 | 3/1987 | Peterson, Jr. | 307/10 R X |
| 4,663,537 | 5/1987 | Goldner et al. | 318/434 X |
| 4,680,512 | 7/1987 | Melocik | 318/434 X |
| 4,698,571 | 10/1987 | Mizuta et al. | 318/466 X |
| 4,710,685 | 12/1987 | Lehnhoff et al. | 318/434 X |
| 4,818,924 | 4/1989 | Burney | 318/434 X |

*Primary Examiner*—Bentsu Ro
*Attorney, Agent, or Firm*—Fleit, Jacobson, Cohn, Price, Holman & Stern

[57] ABSTRACT

There is provided an automotive power seat assembly comprising a movable seat cushion, a backrest tiltable relative to the seat cushion, a reclining mechanism for reclining the backrest, seat rail means including upper rails secured to the seat cushion and lower rails secured to the body of the automobile, a motor for driving the reclining mechanism and a current control circuit for controlling the flow of current through the motor.

1 Claim, 3 Drawing Sheets

AUTOMOTIVE POWER SEAT ASSEMBLY

BACKGROUND OF THE INVENTION

This invention relates to an automotive power seat assembly wherein an automotive seat reclining mechanism and seat rail means are driven by motors.

Hithertofore there has been known an automotive power seat assembly wherein the seat reclining mechanism and seat rail means are driven by motors. In the prior art power seat assembly, the rotation of the motors in the forward and reverse directions and the stoppage of the motors are controlled by switches or relays and when overload current flows through the motor or motors, the flow of current is interrupted by a bimetal circuit breaker. Furthermore, the operation range of the power seat assembly is regulated by a limit switch. In the prior art power seat assembly of the above type, a large type DC magnet motor or motors of high torque - low speed rotation which have high starting torque and are capable of withstanding overload in locking are employed.

The large type DC magnet motor employed in the prior art power seat assembly exhibits high heat resistance and has the characteristic of high torque (maximum of about 8 kg.cm) and low speed rotation (maximum of about 3500 rotations/min.) as shown in FIG. 4 and large magnetic flux as a stationary magnetic pole. The rotor in the magnet motor is of an eight-pole lap winding formed of a thick coil capable of withstanding high load at the time of starting and heat to be generated by large current in locking and sufficient mechanical strength. Thus, the prior art power seat assembly inevitably has such a large size that the assembly can not be incorporated into the seat structure of a small type automobile and is expensive because the motor has a surplus capacity. Furthermore, in the prior art power seat assembly, the rotation of the high torque - low speed motor is controlled by a switch or relay within the region shown by the slanting line in FIG. 4 and thus, when load torque varies substantially as the backrest of the power seat assembly is erected from its horizontal orientation, the rotational speed of the motor varies substantially depending upon the reclining angle of the backrest which presents the problem that smooth and pleasing operation of the power seat assembly can not be achieved. Furthermore, the region for rotating of the motor shown by the slanting line of FIG. 4 presents the problems that the operation efficiency is low, power in the power source mounted on the automobile is wasted and the motor generates a substantial amount of heat with large current due to overload. In addition, when a substantially reducing gear is employed in the prior art power seat assembly, although variation in rotational speed of the motor can be made small, there is the drawback that the rotational speed becomes too slow or the output torque is too high resulting in breakage of the driving component or components themselves when any trouble is present in the component or components.

Furthermore, in the prior art power seat assembly, large starting current flows through the motor at the time of starting and it takes a long time from the time when overload current begins to flow through the motor until the bimetal circuit breaker interrupts the flow of current through the motor and thus, the motor should be a large type and an expensive one which exhibits high heat resistance. In addition, in the prior power seat assembly, since a limit switch for regulating the operation range of the assembly is disposed on each driving portion of the assembly, there is the problem that the circuit wiring between the motor, control circuit and limit switch become complicated.

SUMMARY OF THE INVENTION

In order to solve the problems inherent to the prior art power seat assembly referred to hereinabove, according to the present invention, the power seat assembly is provided with small type motors rotatable at high speed with low torque, a current control circuit for controlling the flow of current to the motors and substantially reducing gears for decelerating the high speed rotation output of the motors whereby current to the motors is maintained at a value below a predetermined maximum value and at the time of overload such as locking, the flow of current to the motors is interrupted by the current control circuit and the high speed rotation output of the motors is transmitted to a driven device through substantially reducing gears.

In operation, the motors are driven at a current value below a predetermined maximum value by the current control circuit and the low torque - high speed rotation output of the motors is transmitted through substantially reducing gears to a driven device as a high torque - low speed rotation driving force to thereby operate the power seat assembly.

And since the flow of the current to the motors is controlled to a value below a predetermined maximum value by the current control circuit, the output torque of the motors and the output torque to be transmitted to the driven device through the substantially reducing gears are also controlled to a value below the predetermined maximum value and the flow of current to the motors is interruped at the time of overload to interrupt the rotation of the motors to thereby release the operation of the power seat assembly.

The control circuit for controlling the rotation of the motors comprises a current limiting circuit for limiting the flow of current to the motors and a breaker circuit for interrupting the flow of current to the motors when current flowing through the motors exceeds the predetermined value.

Thus, the motors start at a current value below the predetermined maximum value and there is no possibility that large starting current flows through the motors. When any trouble occurs in the power seat assembly or when the motors are locked with the assembly in its maximum operative condition in which the assembly operates at its maximum current capacity whereby when the motor current exceeds a predetermined value, the breaker circuit instantly interrupts the flow of current through the motors resulting in stoppage of the power seat assembly.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

DETAILED DESCRIPTION OF THE PREFERRED EMBODIMENT

Figure 1:
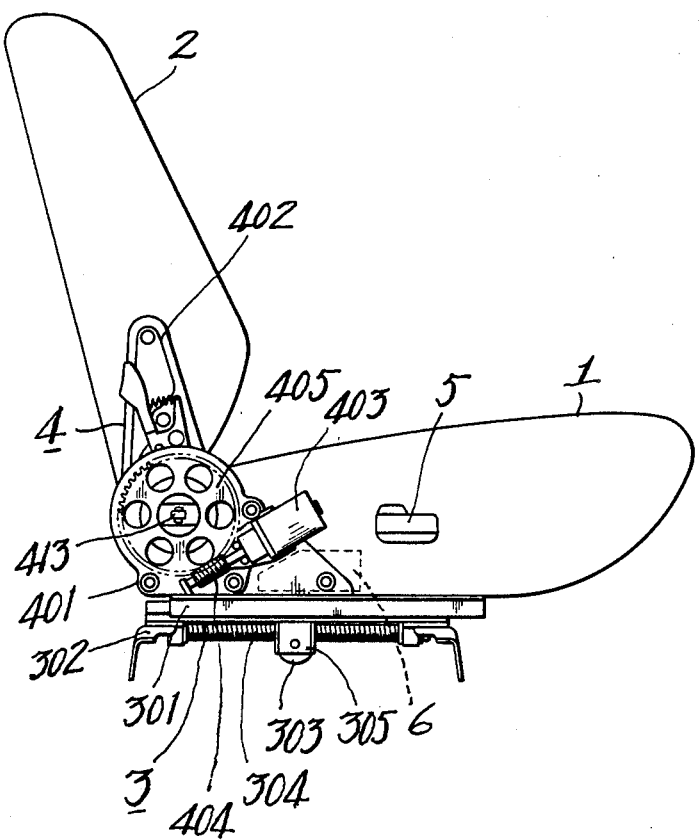
FIG. 1 is a schematic side elevational view of one preferred embodiment of the automotive power seat assembly constructed in accordance with the principle of the present invention.
Figure 4:
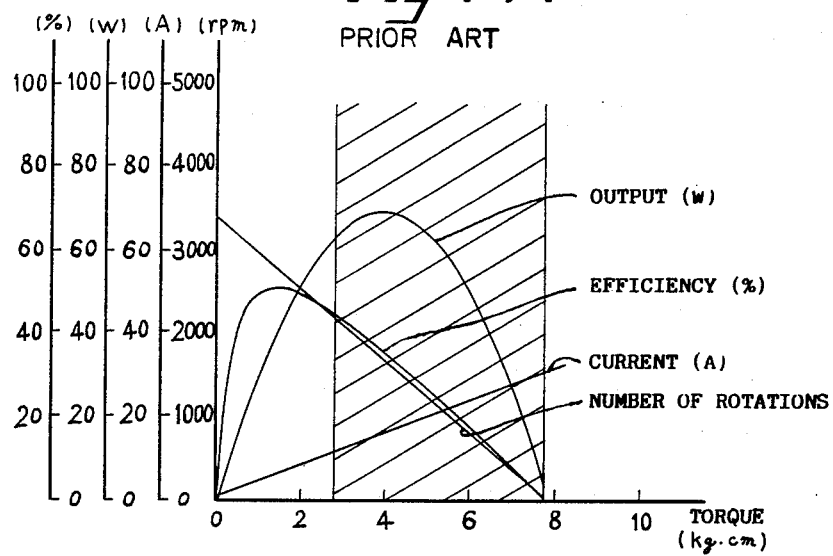
FIG. 4 is a chart showing the characteristic of the motors incorporated in a prior art power seat assembly.

First referring to FIG. 1 of the accompanying drawings which shows the power seat assembly of the present invention, the automotive seat assembly generally comprises a seat cushion 1 and a backrest 2. The seat cushion 1 is mounted on the body of the automobile by means of seat rail means 3 secured to the seat cushion and the backrest 2 is hinged to the rear end of the seat cushion 1 through a reclining mechanism 4. The seat rail means 3 comprises upper rails 301 fixedly secured to the undersurface of the seat cushion 1, lower rails 302 slidably fitted in the upper rails 301 and fixedly secured to the body of the automobile and a substantially reducing gear 305 which is adapted to substantially reduce the rotation output of small type motor 303 rotating at high speed with low torque and transmits the substantially reduced rotation torque to a drive member 304 in the form of a threaded bar. The reclining mechanism 4 has a bracket 401 fixedly secured to the seat cushion 1 and a bracket 402 fixedly secured to the backrest 2 and the two brackets are rotatably connected together by means of a transverse shaft 413. Disposed between the brackets 401 and 402 is a second substantially reducing gear which in combination comprises a reduction mechanism including a worm 404 for reducing the rotation torque of the small type motor 403 rotating at high speed with low torque and a worm wheel 405 and a differential gear reducing mechanism (not shown) for further decelerating the rotation speed of the worm wheel 405. The differential gear reduction mechanism is of a conventional construction comprising internal and external tooth gears formed on the two brackets and the eccentric portion of the shaft 413 and thus not shown in FIG. 1.

In FIG. 1, reference numeral 5 denotes a switch provided on one side of the seat cushion 1 and when the switch 5 is operated as desired, the above-mentioned small type motors 303, 403 are rotated in the forward or reverse direction, started or stopped.

Figure 2:
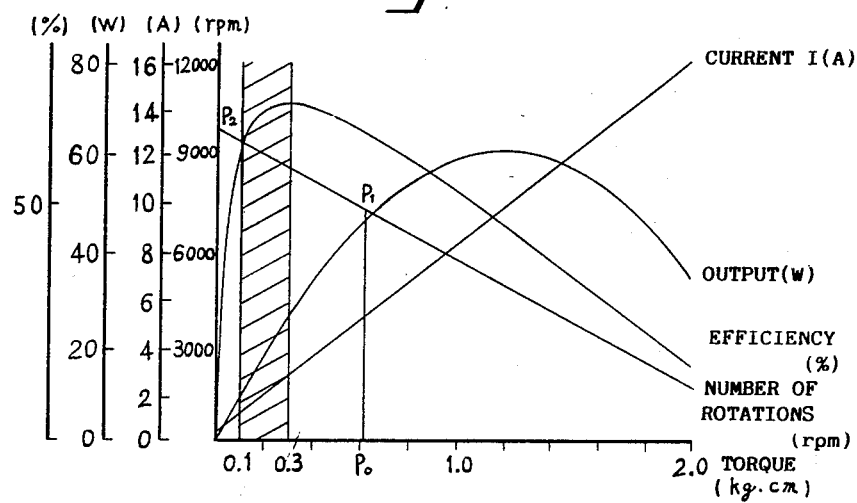
FIG. 2 is a chart showing the characteristic of the motors incorporated in the power seat assembly shown in FIG. 1.

And the above-mentioned small type motors 303, 403 are in the form of a small type magnet of simple construction serving as the stationary magnetic poles and each have the rotor in the form of a three-pole single winding. The small type motors have the characteristic of rotating at high speeds with low torques as shown in FIG. 2 and are merely capable of resisting against heat generated by a large current (about 20 A) for a quite short time at the time of locking.

Figure 3:
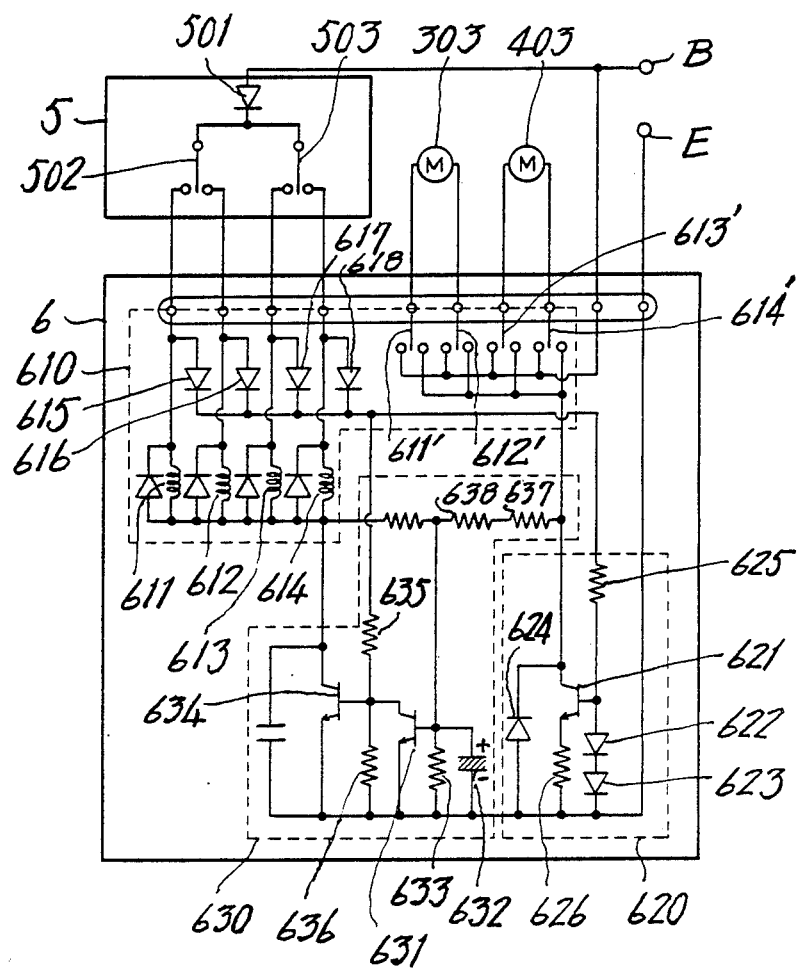
FIG. 3 is a view showing the current control circuit of the electrical system in the power seat assembly of FIG. 1.

The arrangement of the switch 5 and current control circuit 6 will be now described referring to FIG. 3. The switch 5 comprises a diode 501 and two switch circuits 502, 503. The current control circuit 6 comprises a relay circuit 610 operable in response to the operation of the switch 5, a current limiting circuit 620 for maintaining current flowing through the motors 303, 403 at a value below a predetermied maximum value (5 A in the illustrated embodiment) and a breaker circuit 630 for rendering the above-mentioned relay circuit 610 inoperative after current has flowed through the motors 303, 403 for a predetermined time period to thereby interrupt the rotation of the motors 303, 403. The above-mentioned relay circuit 610 has four relay coils 611-614 and the respectively corresponding number of relay contacts 611'-614' and diodes 615-618 which operate in response to the magnetic force of the relay coils 611-614 whereby the motors 303, 403 are rotated in the forward or reverse direction or stopped depending upon the operation mode of the switch 5. The current limiting circuit 620 has a transistor 621, diodes 622-624 and resistances 625, 626 and is in series connected to the motors 303, 403 to always maintain current flowing through the motors at a value below the above-mentioned maximum value. The breaker circuit 630 comprises a delay circuit including a transistor 631, a capacitor 632 and a resistance 633 and a switching circuit including a transistor 634 and resistances 635, 636 which interrupt current flowing through the above-mentioned relay circuit 610. The capacitor 632 of the delay circuit is charged from the collector of the transistor 621 in the above-mentioned current limiting circuit 620 through resistances 637, 638.

Next, the operation of the power seat assembly having the components arranged as descfibed above will be described. When the switch 5 is operated so as to connect the switch circuit 502 to the relay coil 611, for example, current flows from the power source terminal B to the power source terminal E through the diode 501, switching circuit 502, diode 615 and resistances 635, 636 whereupon the relay coil 611 in the relay circuit 610 becomes conductive to allow current to flow to and through the relay coil 611 in the relay circuit 610 whereby the relay contact 611' operates in response to the flow of current through the relay coil 611. The operation of the relay contact 611' allows current to flow from the power source terminal B through the relay contact 611', motor 303, relay contact 612' and the transistor 621 in the current limiting circuit 620 to the power source terminal E to start the motor 303. At this time, the level of the starting current flowing through the motor 303 is limited to a value below the predetermined maximum value (5 A) by the current limiting circuit 620. The motor 303 is started with torque $P_0$ shown in FIG. 2 (about 0.42 kg.cm) and driven in the torque - number of rotation region of $P_1$ - $P_2$ after the motor has attained a steady state. An in the preferred embodiment of the present invention, a substantially reducing gear (the reduction ratio being on the order of about 25 times as high as that attainable by the conventional reducing gear) is employed to maintain the load torque of 0.1-0.3 kg.cm on the motor 303 in its steady state whereby the motor 303 can be operated in the region shown by the oblique line in FIG. 2 where the operation efficiency is quite high with less variation in rotational speed for variation in load torque.

In the illustrated embodiment, when the switching circuit 502 is made on one side the motor 303 rotates in the forward direction and the upper rails 301 and seat cushion 1 are in unison moved forwardly relative to the lower rails 302 and when the switching circuit 502 is made on the opposite side, the motor 303 rotates in the reverse direction and the upper rails and seat cushion are retracted relative to the lower rails. And when the switching circuit 503 is made on either one side, the motor 403 is driven in the manner as described in connection with the motor 303 and the reclining mechanism 4 is operated to adjust the reclining angle of the backrest with respect to the seat cushion 1.

And in the operation described hereinabove, when any excessive load is applied to the motor 303 or 403 due to any trouble in the driven component or components in the seat rail means 3 or reclining mechanism 4, the level of current flowing through the current limiting circuit 620 in the current control circuit 6 increases over the set maximum value (4 A) and the increased current is detected by the breaker circuit 630 which interrupts the flow of current to the motor or motors resulting in the interruption of the operation of the automotive power seat assembly. In other words, when an overload is applied to the motor or motors at the time of locking or the like, the breaker circuit automatically interrupts the flow of current to and through the motor or motors to thereby protect the motor or motors against possible damage in case of overload by a large current and the driving components against possible breakage due to excessive torque.

According to the present invention, since the automotive power seat assembly comprises small type motors rotating at a high rate with low torque, a current control circuit for controlling the flow of current to the motors and substantially reducing gears for reducing the rotation of the motors and the current limiting circuit in the current control circuit is adapted to maintain the level of current flowing through the motors at a value below a predetermined maximum value, different from the automotive power seat assembly employing the conventional large type motors, the automotive power seat assembly of the present invention can be more easily incorporated in small type automobiles and is less expensive. And since the motors are operated in a current level region below a predetermined maximum current value, that is, in a high efficiency current level region, the inventive power seat assembly is not required to employ large type and expensive motors which have surplus resistance to generated heat as seen when used in the conventional automotive power seat assembly and can avoid waste of current in the power source mounted in the automobile. Furthermore, since the current control circuit regulates current consumption and output torque of the motors to values below predetermined maximum values, the disadvantage that the driving components themselves are broken due to excessive torque acting on the driven components can be eliminated by the substantially reducing gears.

The drawings represent one operative embodiment of the invention which is illustrative rather than restrictive and various changes and modifications may be made within the scope of the appended claims. It is intended that the patent shall cover, by suitable expression in the appended claims, whatever features of patentable novelty exist in the invention disclosed.

What is claimed is:

1. An automotive power seat assembly for adjustably operating a reclining mechanism and seat rail means by motors, wherein said automotive power seat assembly comprises motors for rotating at at least 8,000 rpm with torque constrained to 2.5 kg-cm at no load, a current control circuit and reducing gears for decelerating the rotation output of said motors, whereby current to be consumed by said motors is controlled to a value below a predetermined maximum value by said current control circuit and said motors are operated at an efficiency of at least 50%.

* * * * *